(12) United States Patent
Hickerson et al.

(10) Patent No.: US 7,782,323 B2
(45) Date of Patent: Aug. 24, 2010

(54) SYSTEM AND METHOD FOR ADDING ON-SCREEN DISPLAY INFORMATION INTO A VIDEO SIGNAL

(75) Inventors: Dallas Dwight Hickerson, Sharpsburg, GA (US); Bruce Edward Kerkemeyer, Tyrone, GA (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 1146 days.

(21) Appl. No.: 11/418,978

(22) Filed: May 5, 2006

(65) Prior Publication Data

US 2007/0257918 A1   Nov. 8, 2007

(51) Int. Cl.
*G06T 11/00* (2006.01)
(52) U.S. Cl. ..................................................... 345/467
(58) Field of Classification Search ................. 345/467, 345/472.2; 348/563, 569
See application file for complete search history.

(56) References Cited

U.S. PATENT DOCUMENTS

| | | | |
|---|---|---|---|
| 4,344,677 A | 8/1982 | Stuermer et al. | |
| 4,573,199 A * | 2/1986 | Chen et al. | 382/301 |
| 4,686,580 A * | 8/1987 | Kato et al. | 358/451 |
| 5,227,863 A | 7/1993 | Bilbrey et al. | |
| 5,579,057 A * | 11/1996 | Banker et al. | 348/589 |
| 5,781,666 A * | 7/1998 | Ishizawa et al. | 382/284 |
| 6,115,074 A | 9/2000 | Ozkan et al. | |
| 6,181,353 B1 * | 1/2001 | Kurisu | 345/537 |
| 6,249,320 B1 | 6/2001 | Schneidewend et al. | |
| 6,320,920 B1 | 11/2001 | Beyke | |
| 6,661,417 B1 * | 12/2003 | Cheng | 345/469 |
| 6,850,246 B2 * | 2/2005 | Hosotani | 345/589 |
| 6,895,166 B1 | 5/2005 | Schriebman | |

\* cited by examiner

*Primary Examiner*—Ryan R Yang
(74) *Attorney, Agent, or Firm*—Laurence S. Roach

(57) ABSTRACT

The disclosed embodiments relate to a system (100) that is adapted to process digital video data. An exemplary embodiment of the system (100) comprises a processor (110) that produces a digital video data stream (112), and a character generator (200) that is adapted to select a pixel data value from one of a plurality of standard data lines (604, 606, 608, 610) to insert into the digital video data stream (112) based on a representation of a character stored in a memory (210) associated with the character generator (200).

49 Claims, 7 Drawing Sheets

SYSTEM AND METHOD FOR ADDING ON-SCREEN DISPLAY INFORMATION INTO A VIDEO SIGNAL

FIELD OF THE INVENTION

The present invention relates generally to improving the processing of video signals in communication systems. In particular, the present invention relates to a system and method for adding on-screen display (OSD) information into a digital video signal.

BACKGROUND OF THE INVENTION

In systems that display video programs, it is sometimes desirable to overlay alphanumeric characters onto a displayed image. These characters are typically referred to as on-screen display (OSD) information. Examples of the use of OSD information include closed captioning and subtitles for video programming. Another example is the display of a command name such as "PLAY" or "PAUSE" when a command button on a video display system is pressed.

In typical analog video systems, one known method of applying OSD information to a video display involves storing a set of alphanumeric characters and/or icons in a character read only memory (ROM). A typical character ROM may comprise 128 or 256 individual characters (or even more), both alphanumeric and graphic. In such systems, characters stored in the character ROM typically have sharply defined edges. This means that the contrast between the characters themselves and their background is very great. In many cases, this contrast ranges from a minimum pixel value to a maximum pixel value over the space of one picture element or pixel. In some applications, the sharp transitions create artifacts that are objectionable because they are visible on the display or because they create radio frequency energy that is disruptive to other parts of the system.

While character ROMs are effective in analog video systems, they present problems in digital video systems. One problem is that OSD generators in analog systems typically employ a pixel clock having a relatively low clock speed in the range of 3 MHz to 12 MHz. However, digital video systems require a much faster pixel clock. For example, the pixel clock in a digital OSD generator system may typically operate 3-4 times faster than the pixel clock in an analog OSD generator system. Some digital systems operate at a pixel clock speed of about 13.5 MHz, which is 4.5 times the typical minimum analog pixel clock speed of 3 MHz. Because character ROM size requirements are directly proportional to the pixel clock rate, a 3- or 4-fold (or more) increase in clock speed necessitates a proportional increase in the size of the character ROM. For example, when the pixel clock of a system employing a 12×18 character display is increased by a factor of four the character ROM must also be increased by a factor of four. Thus, a single character requiring 216 bytes of character ROM at the typical minimum analog pixel clock speed of 3 MHz requires at least 864 bytes of character ROM when the pixel clock speed is increased to the typical minimum pixel clock speed of 13.5 MHz for a digital system. In a 128-character set, the total character ROM requirement at the higher digital pixel clock speed is 110,592 bytes. The additional memory requirements make use of a typical character ROM scheme an undesirably expensive solution in a digital video system.

Known alternatives to the use of character ROM in digital systems are similarly expensive and/or produce undesirable results. One such alternative is a dual conversion scheme whereby digital video data and OSD characters themselves are converted into an analog format before insertion of the characters into the digital video stream. Analog filter techniques are then used to smooth the OSD characters before insertion. Unfortunately, this process requires an additional conversion back to digital format which introduces artifacts of its own. The costs associated with such a dual conversion scheme are significant. An efficient system and method of inserting OSD information into a digital video stream which reduces transition artifacts is desirable.

SUMMARY OF THE INVENTION

The disclosed embodiments relate to a system that is adapted to process digital video data. An exemplary embodiment of the system comprises a processor that produces a digital video data stream, and a character generator that is adapted to select a pixel data value from one of a plurality of standard data lines to insert into the digital video data stream based on a representation of a character stored in a memory associated with the character generator.

An exemplary method relates to processing digital video data. The exemplary method comprises the acts of producing a digital video data stream, selecting a pixel data value from one of a plurality of standard data lines based on a representation of a character stored in a memory, and inserting the pixel data value into the digital video data stream.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE PREFERRED EMBODIMENT

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The present invention relates to a system and method for efficiently inserting OSD information into a digital video stream for display. An exemplary embodiment of the present invention employs a character memory that stores a coarse binary image (or bitmap) of each character using about the same resolution as typical for an analog video system. The required character memory is, accordingly, not significantly larger than the character memory required for an analog system. In addition, a small number of predefined "standard" data signals corresponding to display lines are stored in high resolution format. As used herein, the terms "standard data signal" or "standard data line" are used to refer to one of a relatively small group of data signals or data lines that may be used to create a much larger set of characters. The standard data lines, which do not themselves represent any specific character, are used in conjunction with the stored character data to create any character in the character set. Thus, the only increase in character memory is the additional memory needed to store the small number (for example, four) standard data lines in high resolution digital format. The standard data lines are defined with smooth transitions, reducing the creation of undesirable artifacts when OSD characters are inserted into a digital video data stream.

An exemplary embodiment of the present invention eliminates the need to store actual minimum, intermediate and maximum pixel level data for each character. Instead, the information stored in memory for each character provides a collection of decision points by which an adaptive address generator, such as an OSD character generator, selects one of a small and finite number of standard data lines to construct the desired character. The adaptive address generator employs appropriate rising/falling edges and maximum/minimum level values. OSD characters are created by the insertion of generic rising/falling edges and predetermined maximum/minimum level values. In this manner, any alphanumeric character or icon may be created without significantly increasing memory requirements relative to conventional systems.

Figure 1:
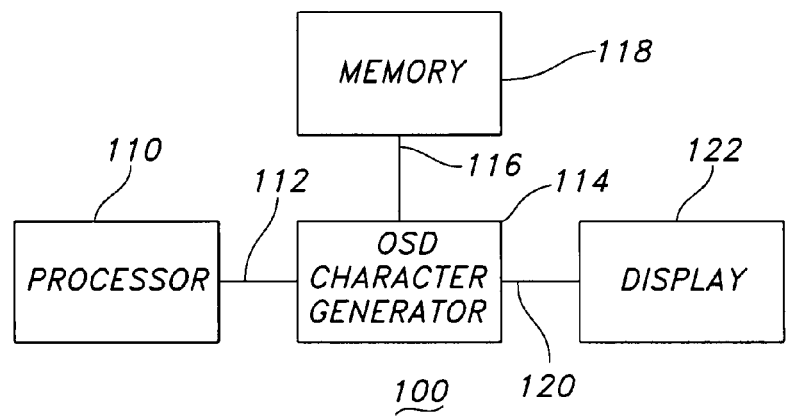
FIG. 1 is a block diagram of a digital video system in accordance with an exemplary embodiment of the present invention.

FIG. 1 is a block diagram of a digital video system in accordance with an exemplary embodiment of the present invention. The video system is generally referred to by the reference number 100. The video system 100 comprises a processor 110, which obtains digital video data from a source such as a DVD player or the like (not shown). The processor 110 produces a digital video data stream 112 and delivers it to an OSD character generator 114 for further processing. The OSD character generator 114 is connected to a memory 118 by a memory interface 116. The memory 118 stores bitmap representations of various alphanumeric and icon data for transformation into OSD character information. Such OSD information is inserted into the digital video data stream 112 by the OSD generator 114 to produce a digital video data stream with OSD information included. That data stream is referred to herein as an OSD digital video data stream 120. The OSD digital video data stream 120 is used to create an image on a display 122, for viewing by a user of the system.

Figure 2:
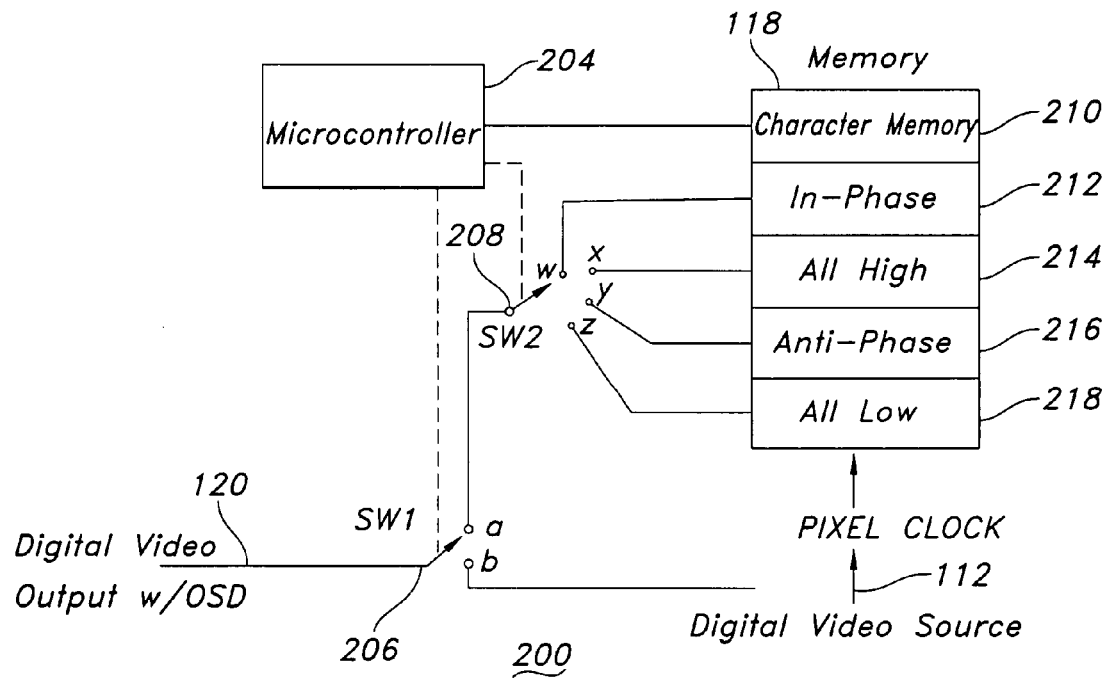
FIG. 2 is a block diagram of an OSD character generator in accordance with an exemplary embodiment of the present invention.

FIG. 2 is a block diagram of an OSD character generator circuit in accordance with an exemplary embodiment of the present invention. The OSD character generator circuit shown in FIG. 2, which is a component of the OSD character generator 114 (FIG. 1), is generally referred to by the reference number 200. The OSD character generator circuit 200 includes a microcontroller 204 which generally controls the operation of the circuit. The microcontroller 204 operates to insert OSD characters into the digital video data stream 112 (FIG. 1) thereby producing digital video out w/OSD signal 120. A first switch circuit 206 selectively receives OSD data (position a) or digital video data from the digital video data stream 112 (position b). Those of ordinary skill in the art will appreciate that first switch circuit 206, which is shown in FIG. 2 as a mechanical switch for purposes of functional illustration only, may comprise a multiplexer and/or other appropriate circuitry. Moreover, the specific components and construction details of first switch circuit 206 are not an essential feature of the present invention.

A second switch circuit 208 selects between one of a plurality of standard data lines to create OSD characters for insertion into the digital video data stream 112. The second switch circuit 208, which is shown in FIG. 2 as a mechanical switch for purposes of functional illustration only, may comprise a multiplexer or other circuitry. Moreover, the specific components and construction details of second switch circuit 208 are not an essential feature of the present invention. The separate standard data lines selected by second switch circuit 208 are stored in the memory 118 as in-phase data 212, all-high data 214, anti-phase data 216 and all-low data 218. The specific composition of these data lines is discussed in greater detail below. The data lines 212-218 stored in the memory 118 are combined with relatively low resolution character data stored in the character memory 210 to create alphanumeric and/or graphic OSD characters for insertion into the digital video data stream 112 by second switch circuit 208 thereby forming digital video output w/OSD signal 120.

The following example explains the insertion of OSD characters into the digital video data stream 112 by the OSD character generator 200. The microcontroller 204 receives an input, such as user input, intended to create an on-screen display. An example of such an input is the signal created by the pushing of a "play" button on a DVD player that is associated with the OSD character generator circuit 200. The external stimulus indicating the need for OSD data causes microcontroller 204 to place first switch circuit 206 in position a. In an exemplary embodiment of the invention, the pressing of the "play" button is intended to cause the word "PLAY" to be displayed on a video screen associated with the system. The microcontroller 204 selects the alphanumeric characters "P", "L", "A", "Y" from the character memory 210. Using the information from the character memory 210, the microcontroller appropriately (as described below) chooses data from the in-phase data 212, all-high data 214, anti-phase data 216 and all-low data 218 to insert the appropriate characters into the digital video data stream 112. The resultant OSD digital video data stream 120 contains both the original video data and the added OSD character data. After the OSD character data is inserted, first switch circuit 206 is returned to position b.

Figure 3:
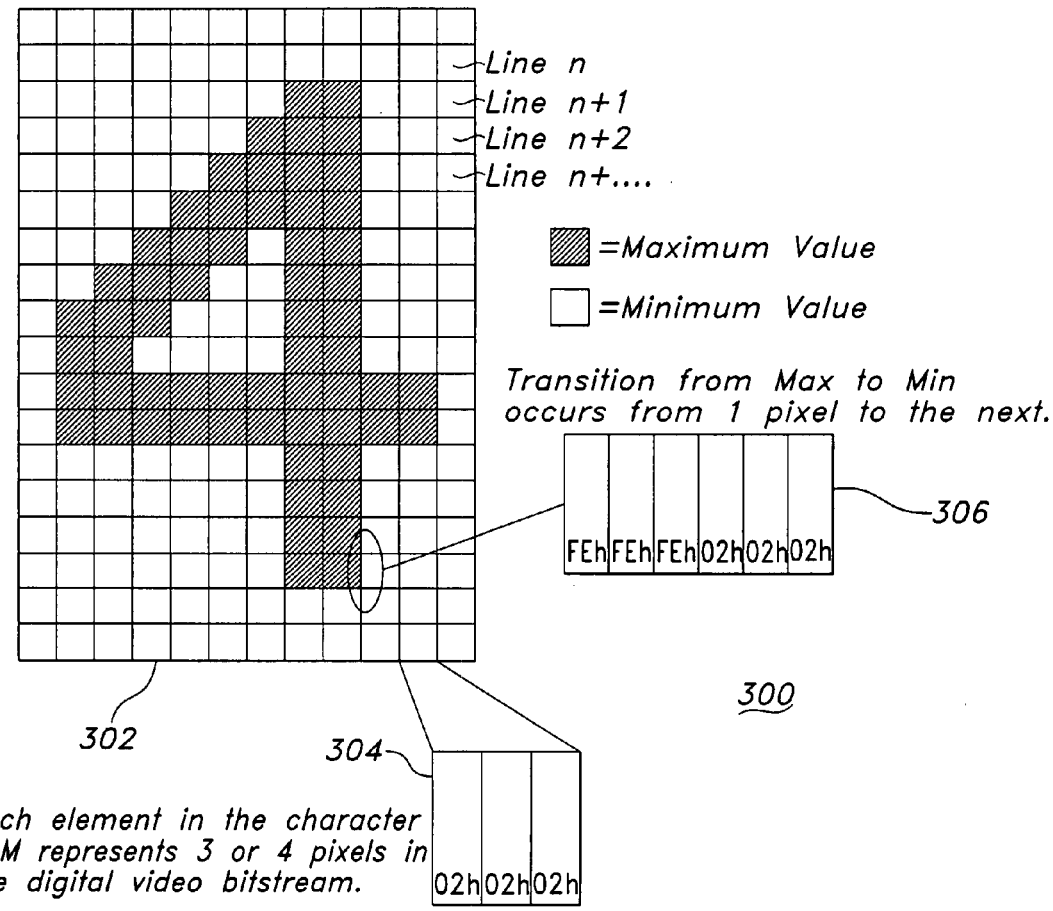
FIG. 3 is a diagram illustrating the use of a character map to provide OSD information.

FIG. 3 is a diagram illustrating a character map that is used to define data to be inserted into a digital video data stream 112 (FIG. 1) as OSD information. The diagram is generally referred to by the reference number 300. A character map grid 302 provides a framework for the definition of alphanumeric characters and icons in a character map. The character map grid 302 comprises a 12×18 array of elements (shown as squares, but not referenced) that represent characters stored in a character memory such as the character memory 210 (FIG. 2). Each element contains a predetermined number of display pixels. For purposes of illustration, FIG. 3 illustrates a numeric character 4 in the character map grid 302.

Each of the pixels within an individual element have separate respective pixel data values associated therewith. In the example shown in FIG. 4, each element of the character map grid 300 represents 3 pixels of data, as shown by a set of pixel data 304. In different digital video systems, the number of pixels represented by each element of a character map varies, but three or four pixels per element are typical. Moreover, the number of pixels represented by each element of the character map grid 302 is not an essential feature of the present invention. Each pixel data value may comprise a digital data word of, for example, 8 bits. As set forth above, an increased clock rate typical of digital video systems results in the need for 3 or 4 pixels of data for each element of the character map grid 302, as well as the corresponding increase in size of the character memory.

An exemplary set of pixel transition data 306 illustrates the problem of artifact creation resulting from sharp data transitions. The pixel data value of the first three pixels in the transition data 306 is FEh. This value represents the maximum pixel data value in a typical 8-bit digital video system. In the example shown in FIG. 3, the value FEh corresponds with the color black. In the example shown in FIG. 3, the pixel data values for the right three data locations 306 (02h) represent the color white, which provides the most possible contrast with respect to the maximum pixel data value FEh. As can be seen in the transition data 306, a maximum transition in values occurs between pixels three and four, i.e., a transition from the highest pixel data value possible (FEh) to the lowest pixel value possible (02h) occurs from one pixel (the third value) to the next pixel (the fourth value). Such a sharp transition in pixel data value is likely to create an undesirable artifact when displayed on a video display. As set forth below, exemplary embodiments of the present invention produce OSD data without sharp transitions and the resulting undesirable video artifacts, and do so without requiring increased system memory necessitated by the use of high resolution character maps.

Figure 4:
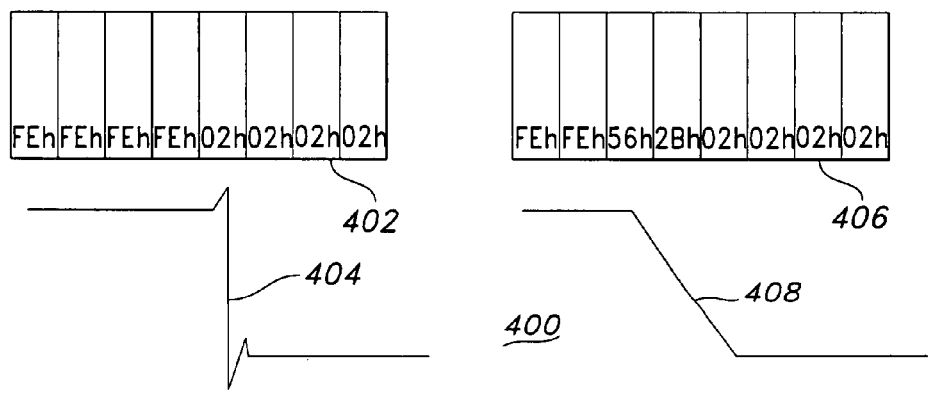
FIG. 4 is a diagram that illustrates smooth transition data and sharp transition data, as well as associated data signals.

FIG. 4 is a diagram that illustrates smooth transition data and sharp transition data, as well as associated data signal waveforms. The graph is generally referred to by the reference number 400. FIG. 4 is useful in explaining the memory savings that may be achieved by an exemplary embodiment of the present invention. It should be noted that smooth transition data can be programmed into the character memory for each character, but that doing so incurs a three- to fourfold memory increase. Embodiments of the present invention, however, may achieve smooth transitions and yet may require only a relatively small increase in character memory requirements.

FIG. 4 shows a plurality of sharp transition data values 402, each of which corresponds to one pixel value. The first four sharp transition data values 402 have a value of FEh, which is the maximum value in a typical 8-bit digital video system. Those bytes are immediately followed by four bytes having a value of 02h, which is the minimum allowable value in a typical system. The result is a sharp transition wave form 404 when corresponding data is applied to a digital video data stream, such as the digital video data stream 112 (FIG. 1).

FIG. 4 also shows a plurality of smooth transition data values 406. Rather than employing four data elements of maximum value, the smooth transition data elements employ only two data elements of maximum value (FEh) followed by two successively smaller valued data elements. In the example shown in FIG. 4, the first of the two successively smaller data elements has a value of 56h and the second of the successively smaller data elements has a value of 28h. The remaining four smooth transition data values 406 have a minimum value of 02h. When applied to a digital video data stream, such as the digital video data stream 112 (FIG. 1), the creation of undesirable video artifacts may be substantially reduced relative to abruptly transitioning data values. A challenge is to create smooth transitions without the significant increase in memory capacity that is typically needed for character mapping in a conventional digital video system. A further illustration of this challenge is explained below with reference to FIG. 5.

Figure 5:
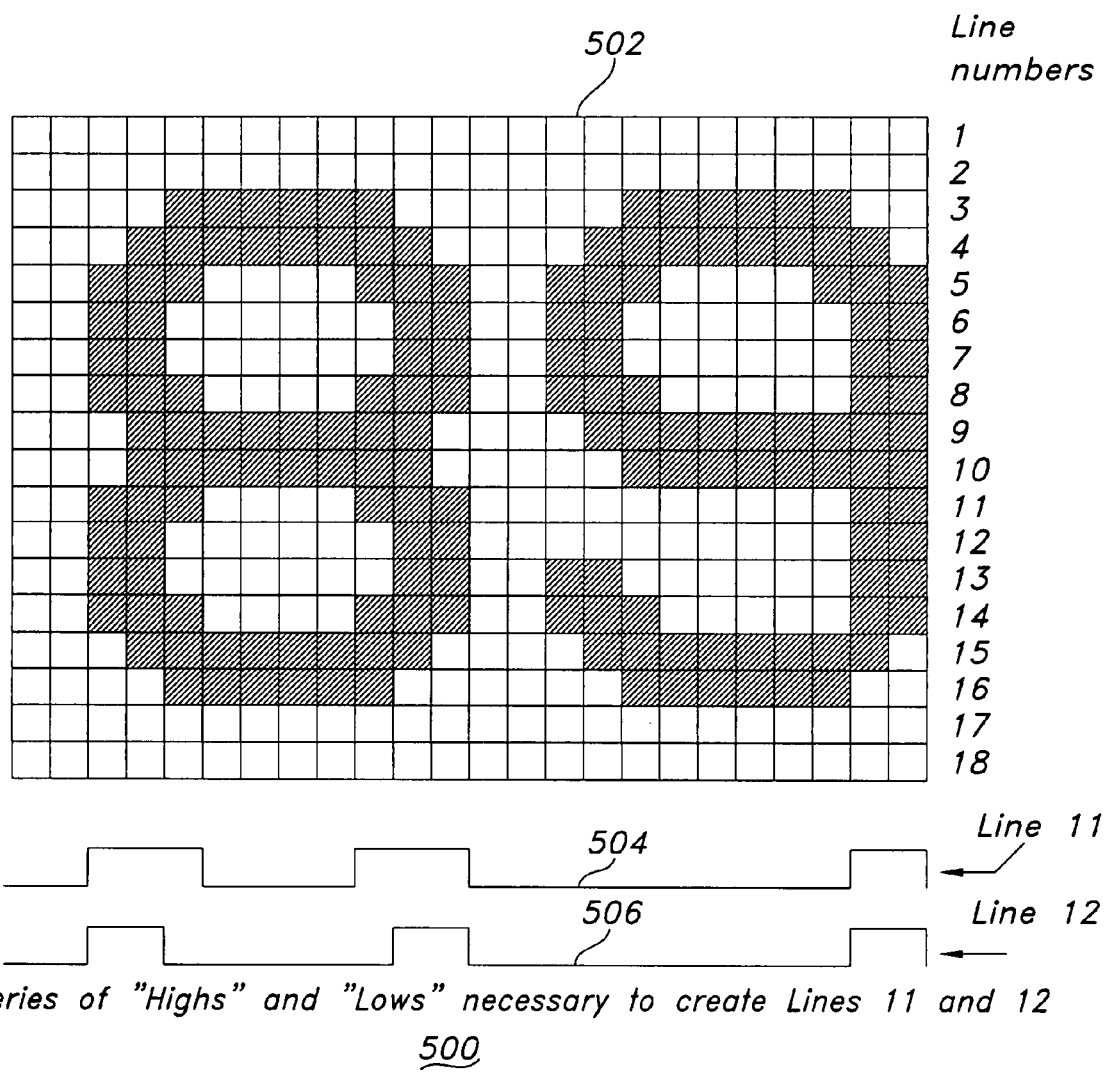
FIG. 5 is a diagram that illustrates data signals used to create OSD information in an analog video system.

FIG. 5 is a diagram that illustrates data signals used to create OSD information in a character ROM system. The diagram explaining the character map operation is generally referred to by the reference number 500. A character map grid 502 has eighteen lines of data. As with the character map grid 302 (FIG. 3), each of the elements (squares) of the character map grid 502 corresponds to multiple pixels on a display screen. The character map grid 502 contains representations of two characters, a numeral 8 and a numeral 9.

Two data signals illustrating the creation of two of the corresponding lines of data in the character map grid 502 are shown in FIG. 5. A character data signal 504 shows data used to produce line 11 of the character map grid 502. A character data signal 506 illustrates the data used to create line 12 of the character map grid 502. The character data signal 504 is high for corresponding elements of the character map grid 502 in which a maximum pixel data value (FEh) is present in line 11, and low (02h) otherwise. The elements having a value of FEh (which are shown as darkened or solid elements) are elements that actually form a portion of the character being displayed (the numerals 8 and 9 in FIG. 5), whereas the elements having a value of 02h (shown as blank or uncolored elements) do not form a portion of the character (or form a blank space of the character(s) displayed). Similarly, the character data signal 506 is high in corresponding grid elements where the data value is a maximum pixel data value (FEh) in line 12, and a minimum pixel data value (02h) otherwise.

An examination of the character segments that make up the numerals 8 and 9 on the character map grid 502 reveals that lines 1, 2, 17 and 18 are identical. Those lines are always the minimum value (02h). Lines 6, 7 and 13 are also identical, because they have identical placement of maximum (FEh) and minimum (02h) values in all elements of those lines. Similarly, lines 3 and 16 are also identical. Of the 18 lines of the character map grid 502, there are 10 different variations or unique line patterns. Thus, creation of the display shown in FIG. 5 can be accomplished using only 10 lines of data rather than 18 (the total number of lines in the character map grid 502). System memory is saved by storing the lines that are repeated only once in a character memory and accessing the stored lines again for successive occurrences of those patterns. The memory savings that is obtained, however, is of limited practical utility since savings is derived with regard to only those characters that can be created with the 10 lines of data. Exemplary embodiments of the present invention, however, achieve substantial memory savings relative to a conventional digital video system by using standard data signals, as is hereinafter more particularly described, to create OSD characters having smooth transitions.

Figure 6:
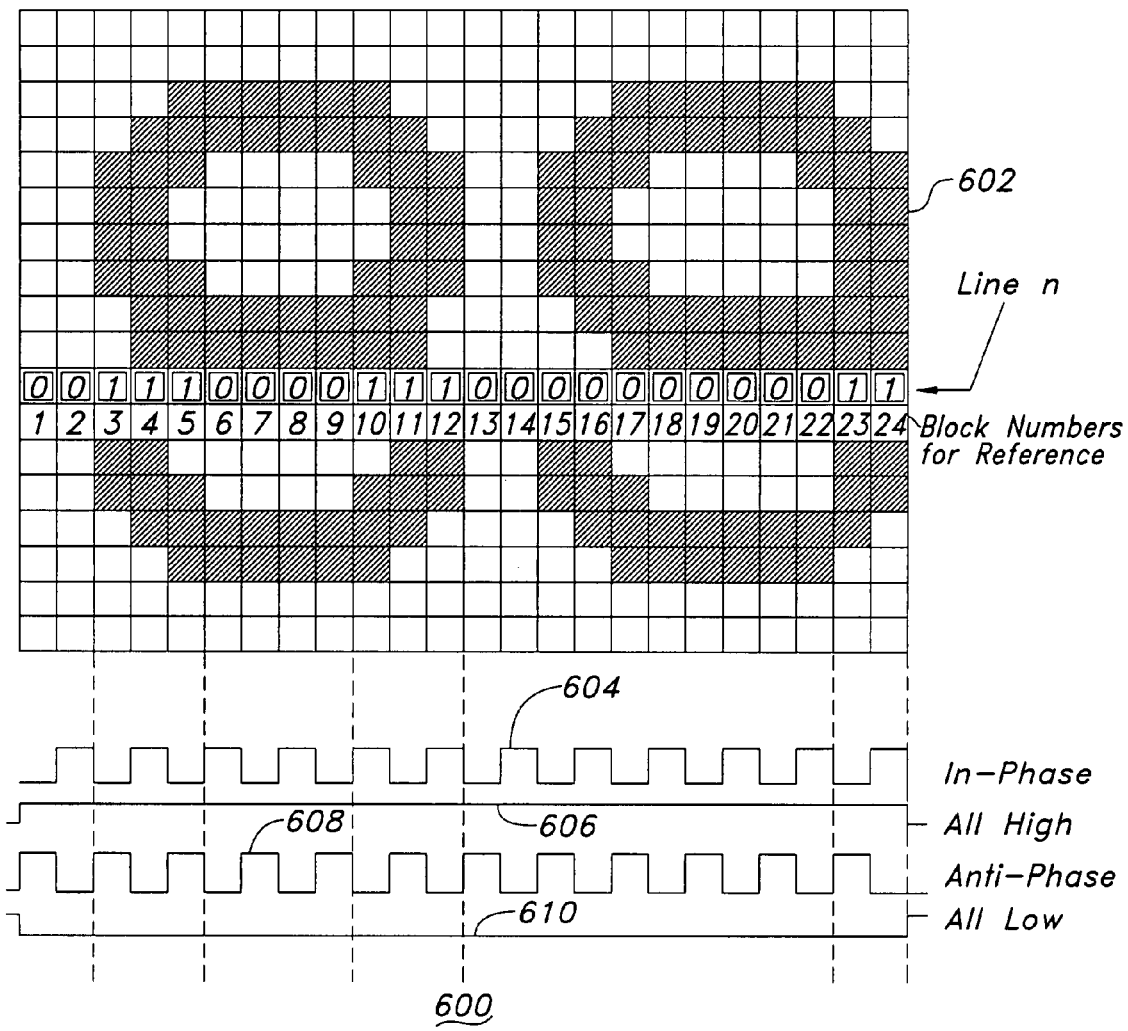
FIG. 6 is a diagram illustrating the use of standard data signals to create OSD character information in accordance with an exemplary embodiment of the present invention.

FIG. 6 is a diagram illustrating the use of standard data signals to create OSD character information in accordance with an exemplary embodiment of the present invention. The diagram is generally referred to by the reference number 600.

A character map grid 602 is shown depicting the display of a numeral 8 and a numeral 9. As with the character map grid 302 (FIG. 3) and the character map grid 502 (FIG. 5), each of the elements (squares) of the character map grid 602 corresponds to multiple pixels on a display screen.

An exemplary embodiment of the present invention employs four distinct standard data lines from which any character desired for insertion into a digital video bit stream may be created. In this exemplary embodiment, an entire character set (e.g., 128 or 256 characters) is stored in a coarse format such as a bitmap. This coarse format is only about one-third or one-quarter of the resolution needed to create the characters at a full digital video pixel rate. In other words, the memory requirements for storage of the character set would be about the same as for a typical analog system.

In addition to the coarse representations of the character set, an additional four lines of data are stored in full resolution (i.e., sufficient for display at the full digital video pixel rate). These four lines make up standard data lines that are selectively accessed to create all the characters of the character set, while producing smooth, relatively artifact free transitions.

In the exemplary embodiment shown in FIG. 6, the four standard data lines stored in full resolution format include an in-phase data line 604, an all-high data line 606, an anti-phase data line 608 and an all-low data line 610. The anti-phase data line 608 is the opposite of the in-phase data line 604, i.e., the anti-phase data line 608 is one-hundred and eighty (180) degrees out of phase with the in-phase data line 604. The only additional memory needed relative to a conventional analog system is the amount of memory used to store the four standard data lines 604, 606, 608 and 610 in high resolution format. Thus, a considerable savings in memory size is achievable in an exemplary embodiment of the present invention relative to the memory size required to store an entire character set of 128 or 256 characters in high resolution format.

By way of example, the following is an explanation of how line n in FIG. 6 is created and inserted into a digital video data stream in accordance with an exemplary embodiment of the present invention. Line n is the same as line 11 illustrated in FIG. 5. For reference, FIG. 6 includes sequential reference numbers (shown immediately below or underneath line n) corresponding to each element in line n. Line n itself includes either a 0 or 1, depending on the corresponding pixel data value of the pixels for that element of the character display. A 1 (pixel data value FEh) corresponds to elements of the character grid map 602 needed to form the actual characters themselves, while a 0 corresponds to all other elements of the character grid map 602. Elements 1 and 2 of line n, which are 0s, are formed by selection of the all-low data line 610 by the microcontroller 204 (FIG. 2). The all-low data line 610 is selected by referencing the data for the corresponding elements of line n of the numeral 8 in the coarse image data stored in character memory.

In the example shown in FIG. 6, element 3 of line n is a 1 because that element is needed to form the numeral 8 in the character map 602. Because the prior state was a 0, a rising edge is needed for element 3. Accordingly, the microcontroller 204 (FIG. 2) selects the anti-phase data line 608 to apply in element 3. Because elements 4 and 5 are also high, the microcontroller 204 (FIG. 2) selects the all-high data line 606 to provide those elements. Element 6 is a 0, which means a falling edge is selected by the microcontroller 204 (FIG. 2). At that point, the anti-phase data line 608 provides a falling edge so the anti-phase data line 608 is selected by the microcontroller 204 (FIG. 2). Thereafter, data for elements 6, 7, 8 and 9 are provided by the all-low data line 610 and so on for the remaining elements 10-24 of line n. As set forth above, an exemplary embodiment of the present invention thus forms any character stored in a coarse resolution character map without significantly increasing system memory requirements.

Figure 7:
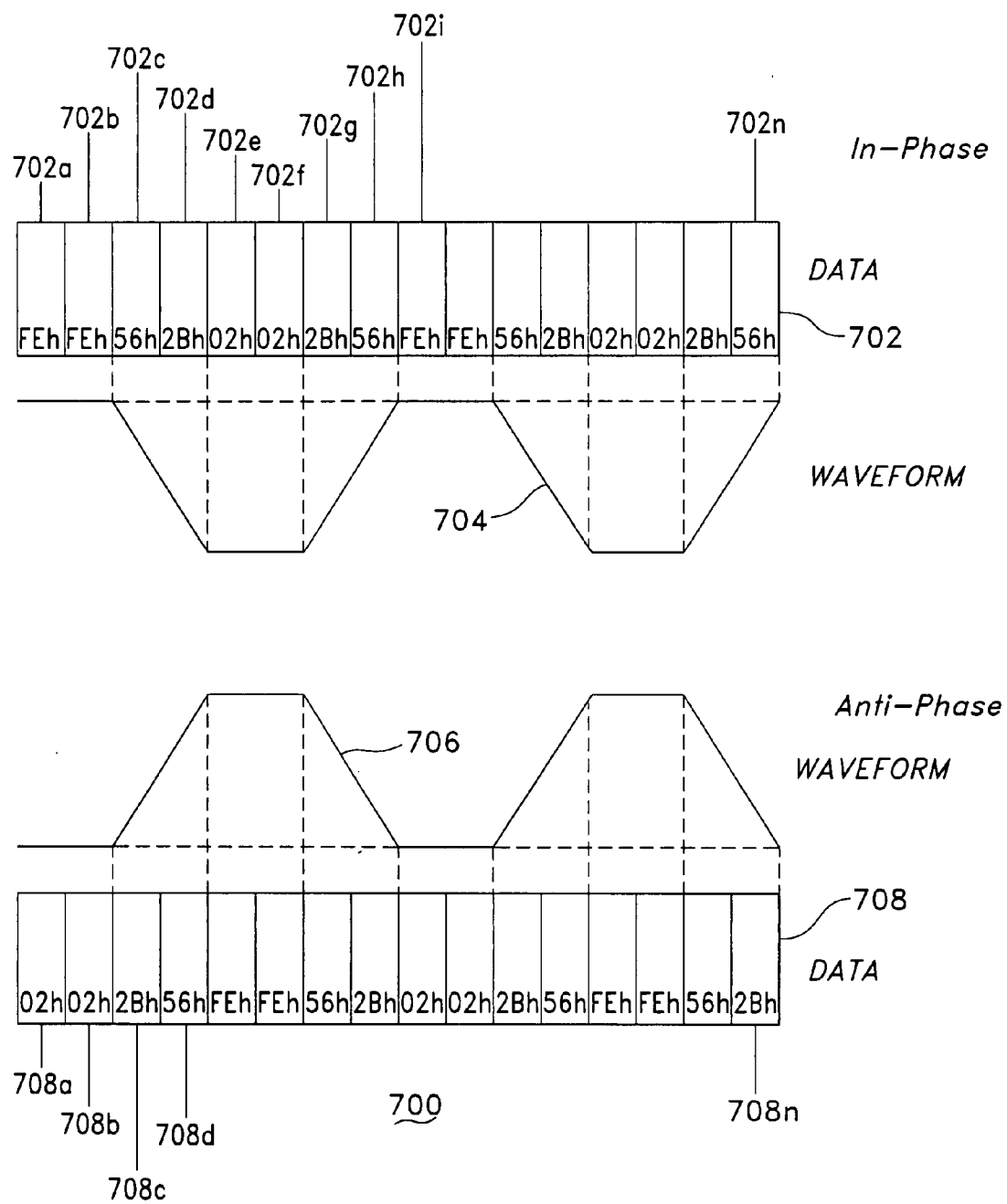
FIG. 7 is a diagram showing in-phase data elements, anti-phase data elements, and associated data signals in accordance with an exemplary embodiment of the present invention.

FIG. 7 is a diagram showing in-phase data, anti-phase data, and associated data signals in accordance with an exemplary embodiment of the present invention. The graph is generally referred to by the reference number 700. FIG. 7 shows how an exemplary embodiment of the present invention may be employed to provide smooth, rather than sharp, transitions between pixels that have pixel data values of significantly different magnitude (e.g., FEh and 02h), and thereby avoid the resulting undesirable image artifacts. Since the in-phase data signal 604 (FIG. 6) and the anti-phase data signal 608 (FIG. 6) are data signals representative of pixel data values that change state, they are stored in high resolution format (unlike the associated character memory). As high-resolution data signals, the in-phase and anti-phase data signals 604, 608 are programmed with or include pixel data values that result in a smooth transition when displayed, as shown in FIG. 7. A plurality of in-phase pixel data values 702a, b, c, . . . n, corresponds to a segment 704 of smooth in-phase signal 604. Each of the in-phase pixel data values 702a, b, c, . . . n are stored in respective memory locations (not shown). The first two in-phase pixel data values 702a, b, are a high or maximum pixel data value, such as FEh. At pixel data value 702c, a high-to-low transition begins. In the exemplary embodiment shown in FIG. 7, the third pixel data value 702c has a transitional value of 56h, and the following pixel data value 702d is programmed at a successively lower transitional value, such as 28h. The next two pixel data values (702e and 702f) have minimum values, such as 02h, followed by a low-to-high transition in the following two pixel data values 702g, h and i. The low-to-high-transition is accomplished by programming for pixel data values 702g, h and i successively greater values, such as 28h, 56h and FEh, as shown in FIG. 7.

Similarly, a segment 706 of the smooth anti-phase data signal 608 (FIG. 6) is shown, along with corresponding anti-phase pixel data values 708a, b, c, . . . . Each of the anti-phase pixel data values 708a, b, c . . . are stored in respective memory locations (not shown). The first two anti-phase pixel data values 708a, b are a low or minimum value, such as 02h. The following low-to-high-transition includes pixel data values 708c and d, which are assigned successively higher transitional values, namely 28h for pixel data value 708c and 56h for pixel data value 708d. Subsequent smooth transitions are similarly accomplished using transitional data values rather than extreme differences in pixel data values or abrupt opposites. In this manner, the combination of coarsely stored character data with the standard data lines 604, 606, 608 and 610 allow creation and insertion of any desired character into a digital video bit stream with smooth transitions at a minimum increase in memory compared to typical analog video systems.

Figure 8:
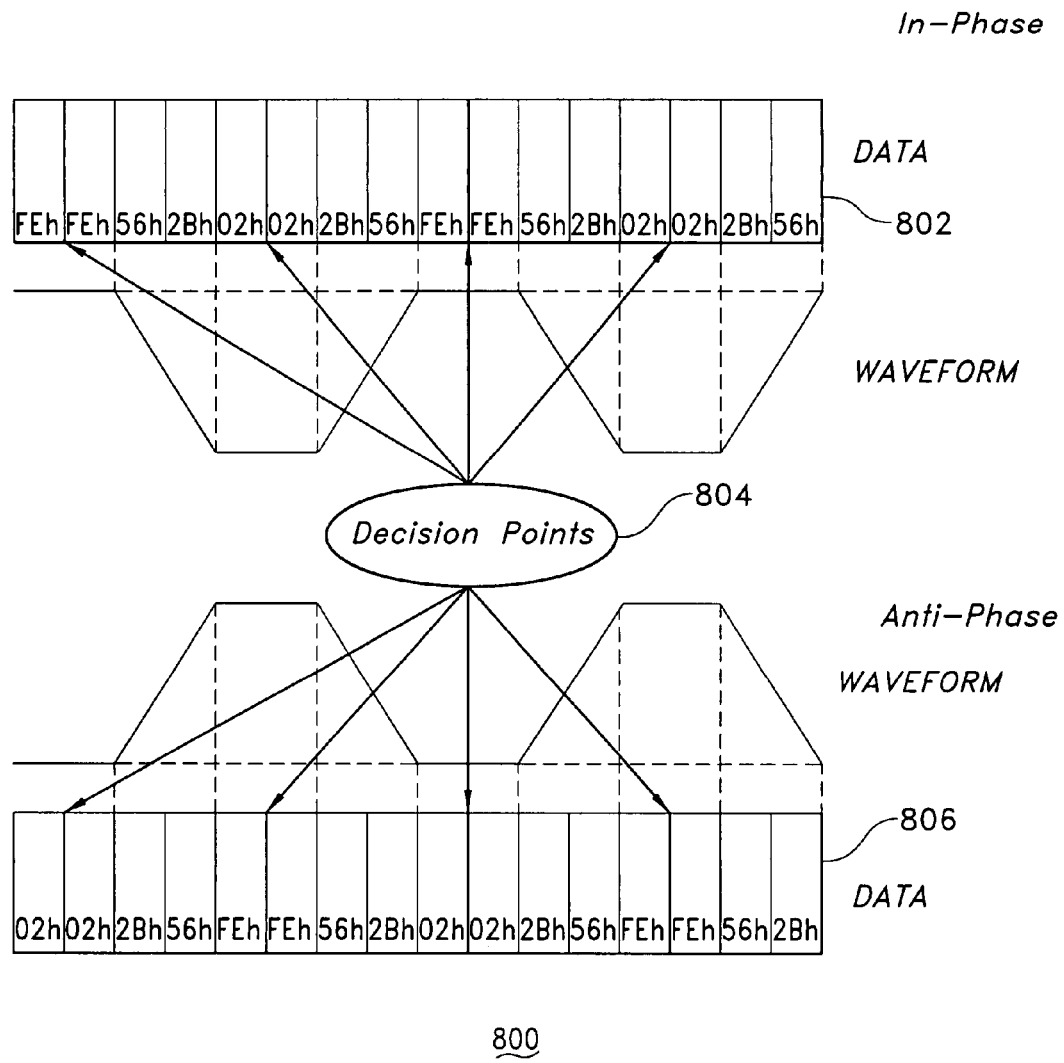
FIG. 8 is a diagram illustrating the use of decision points to indicate one of a plurality of standard data signals in accordance with an exemplary embodiment of the present invention.

FIG. 8 is a diagram illustrating the use of decision points to determine which one of a plurality of standard data lines is accessed in order to assign its corresponding pixel data value to an actual pixel element of a display in accordance with an exemplary embodiment of the present invention. The diagram is generally referred to by the reference number 800. In an exemplary embodiment of the present invention, OSD character data is provided in groups of four bytes, each of which corresponds to one pixel data value. This means that, for every four pixel data values, a decision must be made as to which of the standard data lines contains the next successive pixel data values needed to create the display of the character from the character map 602 that is currently being displayed. For example, if in-phase data 802 from the in-phase data line 604 (FIG. 6) is currently chosen for display, a decision about whether to switch to pixel data values corresponding to another of the standard data lines (such as the anti-phase data 806) occurs at each of a plurality of decision points 804, which correspond to every fourth pixel data value. In other words, a decision is made every four pixel data values to continue displaying pixel data values corresponding to the current one of the four standard data lines or to switch to pixel data value from a different one of the standard data lines. The details of the decision process in an exemplary embodiment of the present invention are discussed below with reference to FIG. 9.

Figure 9:
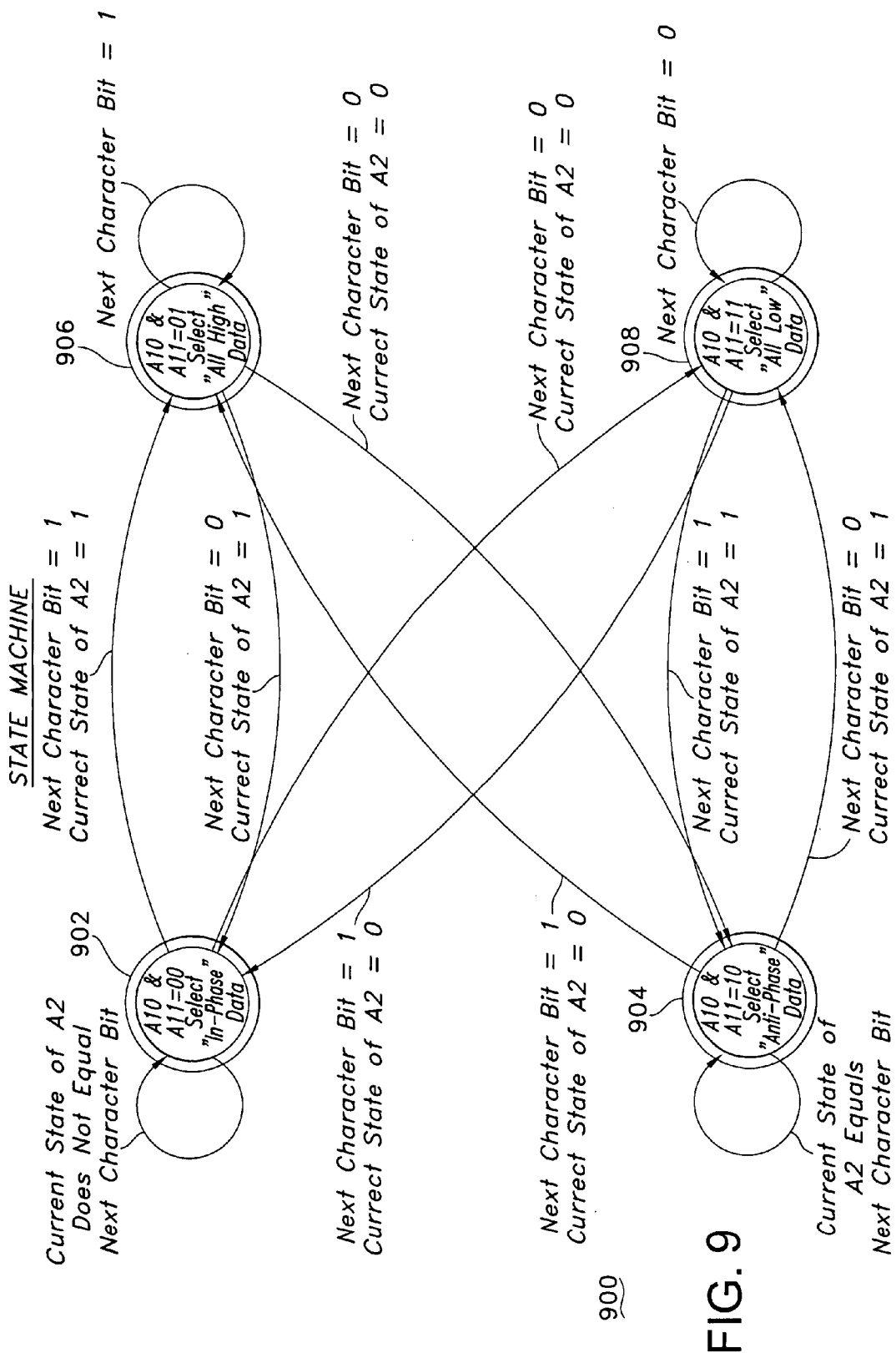
FIG. 9 is a state diagram that is useful in explaining the operation of an exemplary embodiment of the present invention.

FIG. 9 is a state diagram that is useful in explaining the operation of an exemplary embodiment of the present invention. The state diagram is generally referred to by the reference number 900. The state diagram 900 describes the operation of an exemplary embodiment of the present invention that employs a 12-bit memory addressing scheme. The two most significant address bits (MSBs) $A_{10}$ and $A_{11}$ may be used to select the specific one of the four stored high resolution standard data lines. The two MSB address bits may be considered as a row address, with each of the four standard data lines comprising the row. In this example, the 10 least significant bits (LSBs) $A_0$ through $A_9$ provide the address of individual data values for each of the standard data lines selected by the two MSBs. Thus, the 10 LSB address lines may be considered as a column address. In this example, the 10 LSB data lines may be generated by a 10-bit up-counter synchronized with a video line. The MSB address lines may be selected by an adaptive address generator such as the microcontroller 204 (FIG. 2) according to the state diagram 900. Address switching takes place, if needed, at periodic decision points, as discussed above with reference to FIG. 8.

The operations represented by the state diagram 900 exploit the fact that certain pixel data values for the standard in-phase data line 604 (FIG. 6) have been purposely chosen to correspond to the value of one of the address lines used to access the memory location that retains that particular in-phase pixel data value. Specifically, in an exemplary embodiment of the present invention, the data value of the standard in-phase data line (either "0" or "1") is chosen to be the same as the value of an address line $A_2$. In other words, the maximum and minimum pixel data values corresponding to the in-phase data line 604 (FIG. 6) are purposely stored in memory locations chosen to allow the state of those pixel data values to be the same as the value of the $A_2$ address line for those memory locations. In this manner, the pixel data value for the in-phase data line may be determined by the state of the address line $A_2$ without checking the actual data value itself.

In an exemplary embodiment of the present invention, the value of $A_2$ is selected to correspond to the pixel data value of a particular one of the standard data lines because the OSD character data is by definition organized into groups of four pixel values. A separate address location is needed for each of the four pixel values of data. Therefore, the two least significant address lines ($A_0$ and $A_1$) can not be categorically defined to correspond to the data because they must change within each four pixel group of data to access the data. In other words, address line $A_2$ is chosen to correspond to the value of the data because address line $A_2$ is the least significant address line that is guaranteed to be constant for any group of four data values.

By employing this scheme, the data value of all of the four standard data lines are known at any given point just by knowing the value of the address line $A_2$ for the standard in-phase data line 604 (FIG. 6). Specifically, the value of the data for the in-phase data line 604 (FIG. 6) is the same as the value of $A_2$ (by definition). The corresponding value of the standard anti-phase data line 608 (FIG. 6) is the opposite of the value of the standard in-phase data line 604 (FIG. 6). The values of the standard all-high data line 604 (FIG. 6) and all-low data line 610 (FIG. 6) are constant. This means that the value of $A_2$ may be tested at each transition point to determine which of the standard data lines should be chosen to contribute the next four-pixel group of pixel data values.

It should be noted that the pixel data values for each member of the four pixel groups of OSD character data do not have to be the same. In fact, defining elements of the groups of four values (such as the second and third values of each set) to have successively increasing or decreasing intermediate values allows smooth transitions and reduces the creation of artifacts, as described above. Each of the groups of four pixel values comprises either a rising edge or a falling edge in this example.

The state diagram 900 shows an in-phase data state 902, an anti-phase data state 904, an all-high data state 906 and an all-low data state 908. Each of these data states corresponds to one of the four standard data lines described herein. Moreover, those of ordinary skill in the art will appreciate that the state diagram 900 is useful for creating programming to govern the operation of the microcontroller 204 (FIG. 2) as it selects among the standard data lines to produce OSD character data. If the microcontroller 204 has selected pixel data values from the in-phase data line 212 (FIG. 2), the microcontroller 204 is referred to herein as being "in the in-phase data state 902." Similarly, when the microcontroller 204 has selected the all-high data line 214 (FIG. 2), the microcontroller 204 is referred to herein as being "in the all-high data state 906," and so on.

If the microcontroller 204 is in the in-phase data state 902, it will remain there if, at a decision point, the current state of address line $A_2$ does not equal the next character bit (from the coarsely stored character representation stored in the character memory 210 (FIG. 2)) to be displayed. If, at a decision point, the microcontroller 204 is in the in-phase data state 902, the next character bit from the character memory 210 (FIG. 2) is a 1 and the current state of address line $A_2$ is a 1, the microcontroller 204 will transition to the all-high data state 906. If, at a decision point, the microcontroller 204 is in the in-phase data state, the next character bit from the character memory 210 (FIG. 2) is a 0 and the current state of address line $A_2$ is a 0, the microcontroller 204 will transition into the all-low data state 908.

If the microcontroller 204 is in the all-high data state 906, it will remain in that state so long as the next character bit from the character memory 210 (FIG. 2) is a 1. If, at a decision point, the microcontroller 204 is in the all-high data state 906, the microcontroller 204 will transition into the anti-phase data state 904 if the next character bit from the character memory 210 (FIG. 2) is a 0 and the current state of $A_2$ is also 0. If, at a decision point, the microcontroller 204 is in the all-high data state 906, the microcontroller 204 will transition to the in-phase data state 902 if the next character bit from the character memory 210 (FIG. 2) is a 0 and the current state of address line $A_2$ is a 1.

If the microcontroller 204 is in the all-low data state 908, it will remain there so long as the next character bit from the character memory 210 (FIG. 2) is a 0. If, at a decision point, the microcontroller 204 is in the all-low data state 908, the microcontroller 204 will transition to the anti-phase data state 904 if the next character bit from the character memory 210

(FIG. 2) is a 1 and the current state of address line $A_2$ is also a 1. If, at a decision point, the microcontroller 204 is in the all-low data state 908, the microcontroller 204 will transition to the in-phase data state 902 if the next character bit from the character memory 210 (FIG. 2) is a 1 and the current state of address line $A_2$ is a 0.

If the microcontroller 204 is in the anti-phase data state 904, it will remain there so long as the current state of the address line $A_2$ is equal to the next character bit from the character memory 210 (FIG. 2). If, at a decision point, the microcontroller 204 is in the anti-phase data state 904, the microcontroller will transition to the all-high data state 906 if the next character bit from the character memory 210 (FIG. 2) is a 1 and the current state of the address line $A_2$ is a 0. If, at a decision point, the microcontroller 204 is in the anti-phase data state 904, the microcontroller 204 will transition to the all-low data state 908 if the next character bit from the character memory 210 (FIG. 2) is a 0 and the current state of the address line $A_2$ is a 1.

With respect to reducing memory requirements for character memory in accordance with an exemplary embodiment of the present invention, a greater memory savings may be realized if the in-phase and anti-phase data lines repeat in an integer multiple of one or more character blocks. For example, if an 8×12 character map is used, only 32 bytes are needed provided that the 32 bytes are repeated across a given line. In that case, a 5-bit counter instead of the 10-bit counter previously discussed could be used to count each pixel in an entire line. A 16×24 character map would need 64 bytes and a 6-bit counter to address them and so on.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system (100) that processes digital video data, comprising:
    a processor (110) that produces a digital video data stream (112);
    a character generator (200) that selects from one of a plurality of standard data lines (604, 606, 608, 610) a selected pixel data value, the selected pixel data value being at least in part based on a representation of a character stored in a memory (210) associated with the character generator (200) inserting the selected pixel data value into the digital video bit stream (112); and
    wherein the character generator (200) comprises a microcontroller (204) operating as a state machine that:
        transitions from an all-low data state (908) corresponding to an all-low standard data line (606) to an in-phase data state (902) corresponding to an in-phase standard data line (604) if a current in-phase data bit value corresponding to a current value of the in-phase standard data line (604) is low and a next pixel data value corresponding to a next bit of the representation of the character stored in the memory (210) is high;
        transitions from an all-high data state (906) corresponding to an all-high standard data line (610) to the in-phase data state (902) if the current in-phase data bit value is high and the next pixel data value is low; and
        wherein the selected pixel data value is selected from the in-phase standard data line (604) when the state machine is in the in-phase data state (902).

2. The system (100) recited in claim 1, wherein the state machine maintains itself in the in-phase data state (902) if the current in-phase data bit value does not equal the next pixel data value.

3. A method of inserting a pixel data value into a digital video data stream (112), the pixel data value being selected from one of a plurality of standard data lines (604, 606, 608, 610), the selection of the pixel data value being made according to a state of a state machine, the method comprising:
    transitioning the state machine from an all-low data state (908) corresponding to an all-low standard data line (606) to an in-phase data state (902) corresponding to an in-phase standard data line (604) if a current in-phase data bit value corresponding to a current value of the in-phase standard data line (604) is low and a next pixel data value corresponding to a next bit of a representation of a stored character is high;
    transitioning the state machine from an all-high data state (906) corresponding to an all-high standard data line (610) to the in-phase data state (902) if the current in-phase data bit value is high and the next pixel data value is low;
    selecting the pixel data value from the in-phase standard data line (604) when the state machine is in the in-phase data state (902); and
    inserting the pixel data value selected from the in-phase standard data line (604) into the digital video bit stream (112).

4. The method recited in claim 3, comprising maintaining the state machine in the in-phase data state (902) if the current in-phase data bit value does not equal the next pixel data value.

5. The system (100) recited in claim 3, wherein the state machine maintains itself in the all-high data state (906) if the next pixel data value is high.

6. A system (100) that processes digital video data, comprising:
    a processor (110) that produces a digital video data stream (112);
    a character generator (200) that selects from one of a plurality of standard data lines (604, 606, 608, 610) a selected pixel data value, the selected pixel data value being at least in part based on a representation of a character stored in a memory (210) associated with the character generator (200), the character generator (200) inserting the selected pixel data value into the digital video bit stream (112); and
    wherein the character generator (200) comprises a microcontroller (204) operating as a state machine that:
        transitions from an in-phase data state (902) corresponding to an in-phase standard data line (604) to an all-high data state (906) corresponding to an all-high standard data line (610) if a current in-phase data bit value corresponding to a current value of the in-phase standard data line (604) and a next pixel data value of the representation of the character stored in the memory (210) are both high;
        transitions from an anti-phase data state (904) corresponding to an anti-phase standard data line (608) to the all-high data state (906) if the current in-phase data bit value is low and the next pixel data value is high; and
        wherein the selected pixel data value is selected from the all-high standard data line (606) when the state machine is in the all-high data state (906).

7. A method of inserting a pixel data value into a digital video data stream (112), the pixel data value being selected from one of a plurality of standard data lines (604, 606, 608, 610), the selection of the pixel data value being made according to a state of a state machine, the method comprising:

transitioning the state machine from an in-phase data state (902) corresponding to an in-phase standard data line (604) to an all-high data state (906) corresponding to an all-high standard data line (610) if a current in-phase data bit value corresponding to a current value of the in-phase standard data line (604) and a next pixel data value of the representation representation of the character stored in the memory (210) are both high; and transitioning the state machine from an anti-phase data state (904) corresponding to an anti-phase standard data line (608) to the all-high data state (906) if the current in-phase data bit value is low and the next pixel data value is high;

selecting the pixel data value from the all-high standard data line (606) when the state machine is in the all-high data state (906); and inserting the pixel data value selected from the all-high standard data line (606) into the digital video bit stream (112).

8. The method recited in claim 7, comprising maintaining the state machine in the all-high data state (906) if the next pixel data value is high.

9. A system (100) that processes digital video data, comprising:

a processor (110) that produces a digital video data stream (112);

a character generator (200) that selects from one of a plurality of standard data lines (604, 606, 608, 610) a selected pixel data value, the selected pixel data value being at least in part based on a representation of a character stored in a memory (210) associated with the character generator (200), the character generator (200) inserting the selected pixel data value into the digital video bit stream (112); and wherein the character generator (200) comprises a microcontroller (204) operating as a state machine that:

transitions from an in-phase data state (902) corresponding to an in-phase standard data line (604) to an all-low data state (908) corresponding to an all-low standard data line (606) if a current in-phase data bit value corresponding to a current value of the in-phase standard data line (604) and a next pixel data value of the representation of the character stored in the memory (210) are are both low; and transitions from an anti-phase data state (904) corresponding to an anti-phase standard data line (608) to the all-low data state (908) if the current in-phase data bit value is high and the next pixel data value is low; and wherein the selected pixel data value is selected from the all-low standard data line (610) when the state machine is in the all-low data state (908).

10. The system (100) recited in claim 9, wherein the state machine maintains itself in the all-low data state (908) if the next pixel data value is low.

11. A method of inserting a pixel data value into a digital video data stream (112), the pixel data value being selected from one of a plurality of standard data lines (604, 606, 608, 610), the selection of the pixel data value being made according to a state of a state machine, the method comprising:

transitioning the state machine from an in-phase data state (902) corresponding to an in-phase standard data line (604) to an all-low data state (908) corresponding to an all-low standard data line (606) if a current in-phase data bit value corresponding to a current value of the in-phase standard data line (604) and a next pixel data value of the representation of the character stored in the memory (210) are both low;

transitioning the state machine from an anti-phase data state (904) corresponding to an anti-phase standard data line (608) to the all-low data state (908) if the current in-phase data bit value is high and the next pixel data value is low;

selecting the pixel data value from the all-low standard data line (610) when the state machine is in the all-low data state (908); and inserting the pixel data value selected from the all-low standard data line (610) into the digital video bit stream (112).

12. The method recited in claim 11, comprising maintaining the state machine in the all-low data state (908) if the next pixel data value is low.

13. A system (100) that processes digital video data, comprising:

a processor (110) that produces a digital video data stream (112);

a character generator (200) that selects from one of a plurality of standard data lines (604, 606, 608, 610) a selected pixel data value, the selected pixel data value being at least in part based on a representation of a character stored in a memory (210) associated with the character generator (200), the character generator (200) inserting the selected pixel data value into the digital video bit stream (112); and wherein the character generator (200) comprises a microcontroller (204) operating as a state machine that:

transitions from an all-high data state (906) corresponding to an all-high standard line (610) to an anti-phase data state (904) corresponding to an anti-phase standard data line (608) if a current in-phase data bit value corresponding to a current value of the in-phase data line (604) and a next pixel data value of the representation of the character stored in the memory (210) are both low; and transitions from an all-low data state (908) corresponding to an all-low standard data line (606) to the anti-phase data state (904) if the current in-phase data bit value is high and the next pixel data value is low; and wherein the selected pixel data value is selected from the anti-phase standard data line (608) when the state machine is in the anti-phase data state (904).

14. The system (100) recited in claim 13, wherein the state machine maintains itself in the anti-phase data state (904) if the current in-phase data bit value equals the next pixel data value.

15. A method of inserting a pixel data value into a digital video data stream (112), the pixel data value being selected from one of a plurality of standard data lines (604, 606, 608, 610), the selection of the pixel data value being made according to a state of a state machine, the method comprising:

transitioning the state machine from an all-high data state (906) corresponding to an all-high standard line (610) to an anti-phase data state (904) corresponding to an anti-phase standard data line (608) if a current in-phase data bit value corresponding to a current value of the in-phase data line (604) and a next pixel data value of the representation of the character stored in the memory (210) are both low;

transitioning the state machine from an all-low data state (908) corresponding to an all-low standard data line (606) to the anti-phase data state (904) if the current in-phase data bit value is high and the next pixel data value is low;

selecting the pixel data value from the anti-phase standard data line (608) when the state machine is in the anti-phase data state (904); and inserting the pixel data value selected from the anti-phase standard data line (608) into the digital video bit stream (112).

16. The method recited in claim 15, comprising maintaining the state machine in the anti-phase data state (904) if the current in-phase data bit value equals the next pixel data value.

17. A system (100) that processes digital video data, comprising:

a processor (110) that produces a digital video data stream (112);

a character generator (200) that selects from one of a plurality of standard data lines (604, 606, 608, 610) a selected pixel data value, the selected pixel data value being at least in part based on a representation of a character stored in a memory (210) associated with the character generator (200), the character generator (200) inserting the selected pixel data value into the digital video bit stream (112); and wherein the character generator (200) comprises a microcontroller (204) operating as a state machine that:

transitions from an all-low data state (908) corresponding to an all-low standard data line (606) to an in-phase data state (902) corresponding to an in-phase standard data line (604) if a current in-phase data bit value corresponding to a current value of the in-phase standard data line (604) is low and a next pixel data value corresponding to a next bit of the representation of the character stored in the memory (210) is high;

transitions from an all-high data state (906) corresponding to an all-high standard data line (610) to the in-phase data state (902) if the current in-phase data bit value is high and the next pixel data value is low;

transitions from the in-phase data state (902) to the all-high data state (906) if the current in-phase data bit value and the next pixel data value are both high;

transitions from an anti-phase data state (904) corresponding to an anti-phase standard data line (608) to the all-high data state (906) if the current in-phase data bit value is low and the next pixel data value is high;

transitions from the in-phase data state (902) to the all-low data state (908) if the current in-phase data bit value and the next pixel data value are both low;

transitions from the anti-phase data state (904) to the all-low data state (908) if the current in-phase data bit value is high and the next pixel data value is low;

transitions from the all-high data state (906) to the anti-phase data state (904) if the current in-phase data bit value and the next pixel data value are both low;

transitions from the all-low data state (908) to the anti-phase data state (904) if the current in-phase data bit value is high and the next pixel data value is low; and wherein the selected pixel data value is selected from the in-phase standard data line (604) when the state machine is in the in-phase data state (902), and wherein the selected pixel data value is selected from the all-high standard data line (606) when the state machine is in the all-high data state (906), and wherein the selected pixel data value is selected from the all-low standard data line (610) when the state machine is in the all-low data state (908) and wherein the selected pixel data value is selected from the anti-phase standard data line (608) when the state machine is in the anti-phase data state (904).

18. The system (100) recited in claim 17, wherein the state machine maintains itself in the in-phase data state (902) if the current in-phase data bit value does not equal the next pixel data value.

19. The system (100) recited in claim 17, wherein the state machine maintains itself in the all-high data state (906) if the next pixel data value is high.

20. The system (100) recited in claim 17, where in the state machine maintains itself in the all-low data state (908) if the next pixel data value is low.

21. The system (100) recited in claim 17, wherein the state machine maintains itself in the anti-phase data state (904) if the current in-phase data bit value equals the next pixel data value.

22. A method of inserting a pixel data value into a digital video data stream (112), the pixel data value being selected from one of a plurality of standard data lines (604, 606, 608, 610), the selection of the pixel data value being made according to a state of a state machine, the method comprising:

transitioning the state machine from an all-low data state (908) corresponding to an all-low standard data line (606) to an in-phase data state (902) corresponding to an in-phase standard data line (604) if a current in-phase data bit value corresponding to a current value of the in-phase standard data line (604) is low and a next pixel data value corresponding to a next bit of a representation of a stored character is high;

transitioning the state machine from an all-high data state (906) corresponding to an all-high standard data line (610) to the in-phase data state (902) if the current in-phase data bit value is high and the next pixel data value is low;

transitioning the state machine from the in-phase data state (902) to the all-high data state (906) if the current in-phase data bit value and the next pixel data value are both high;

transitioning the state machine from an anti-phase data state (904) corresponding to an anti-phase standard data line (608) to the all-high data state (906) if the current in-phase data bit value is low and the next pixel data value is high;

transitioning the state machine from the in-phase data state (902) to the all-low data state (908) if the current in-phase data bit value and the next pixel data value are both low;

transitioning the state machine from the anti-phase data state (904) to the all-low data state (908) if the current in-phase data bit value is high and the next pixel data value is low;

transitioning the state machine from the all-high data state (906) to the anti-phase data state (904) if the current in-phase data bit value and the next pixel data value are both low;

transitioning the state machine from the all-low data state (908) to the anti-phase data state (904) if the current in-phase data bit value is high and the next pixel data value is low;

selecting the pixel data value from the in-phase standard data line (604) when the state machine is in the in-phase data state (902);

selecting the pixel data value from the all-high standard data line (606) when the state machine is in the all-high data state (906);

selecting the pixel data value from the all-low standard data line (610) when the state machine is in the all-low data state (908);

selecting the pixel data value from the anti-phase standard data line (608) when the state machine is in the anti-phase data state (904); and inserting the pixel data value into the digital video bit stream (112).

23. The method recited in claim 22, comprising maintaining the state machine in the in-phase data state (902) if the current in-phase data bit value does not equal the next pixel data value.

24. The method recited in claim 22, comprising maintaining the state machine in the all-high data state (906) if the next pixel data value is high.

25. The method recited in claim 22, comprising maintaining the state machine in the all-low data state (908) if the next pixel data value is low.

26. The method recited in claim 22, comprising maintaining the state machine in the anti-phase data state (904) if the current in-phase data bit value equals the next pixel data value.

27. The method recited in claim 26, wherein the transition data comprises at least one pair of successively decreasing pixel data values.

28. A system (100) for processing digital video data, comprising:
    means (110) for producing a digital video data stream (112);
    means (204) for selecting a pixel data value from one of a plurality of standard data lines (604, 606, 608, 610) based on a representation of a character stored in a memory (210), the plurality of standard data lines (604, 606, 608, 610) is stored in the memory (210) at a resolution that is 3 to 4 times higher than a resolution of the representation of the character; and
    means (206, 208) for inserting the pixel data value into the digital video data stream (112).

29. A system (100) for processing digital video data, comprising:
    means (110) for producing a digital video data stream (112);
    means (204) for selecting a pixel data value from one of a plurality of standard data lines (604, 606, 608, 610) based on a representation of a character stored in a memory (210), wherein the plurality of standard data lines (604, 606, 608, 610) comprises an in-phase data line (604); and
    means (206, 208) for inserting the pixel data value into the digital video data stream (112).

30. The system (100) recited in claim 29, wherein the plurality of standard data lines (604, 606, 608, 610) comprises an anti-phase data line (608).

31. A system (100) for processing digital video data, comprising:
    means (110) for producing a digital video data stream (112);
    means (204) for selecting a pixel data value from one of a plurality of standard data lines (604, 606, 608, 610) based on a representation of a character stored in a memory (210), wherein the plurality of standard data lines (604, 606, 608, 610) comprises an all-high data line (606); and
    means (206, 208) for inserting the pixel data value into the digital video data stream (112).

32. A system (100) for processing digital video data, comprising:
    means (110) for producing a digital video data stream (112);
    means (204) for selecting a pixel data value from one of a plurality of standard data lines (604, 606, 608, 610) based on a representation of a character stored in a memory (210), wherein the plurality of standard data lines (604, 606, 608, 610) comprises an all-low data line (610); and
    means (206, 208) for inserting the pixel data value into the digital video data stream (112).

33. A system (100) for processing digital video data, comprising:
    means (110) for producing a digital video data stream (112);
    means (204) for selecting a pixel data value from one of a plurality of standard data lines (604, 606, 608, 610) based on a representation of a character stored in a memory (210), wherein at least one of the plurality of standard data lines (604, 606, 608, 610) comprises transition data from a low level (0) to a high (1) level; and
    means (206, 208) for inserting the pixel data value into the digital video data stream (112).

34. The system (100) recited in claim 33, wherein the transition data comprises at least one pair of successively increasing pixel data values.

35. A system (100) for processing digital video data, comprising:
    means (110) for producing a digital video data stream (112);
    means (204) for selecting a pixel data value from one of a plurality of standard data lines (604, 606, 608, 610) based on a representation of a character stored in a memory (210), wherein at least one of the plurality of standard data lines (604, 606, 608, 610) comprises transition data from a high level (1) to a low (0) level; and
    means (206, 208) for inserting the pixel data value into the digital video data stream (112).

36. The system (100) recited in claim 35, wherein the transition data comprises at least one pair of successively decreasing pixel data values.

37. A system (100) that processes digital video data, comprising:
    a processor (110) that produces a digital video data stream (112); and
    a character generator (200) that selects a pixel data value from one of a plurality of standard data lines (604, 606, 608, 610) to insert into the digital video data stream (112) based on a representation of a character stored in a memory (210) associated with the character generator (200), the character generator (200) comprising a microcontroller (204) operating as a state machine that:
        transitions from an all-low data state (908) corresponding to an all-low standard data line (606) to an in-phase data state (902) corresponding to an in-phase standard data line (604) if a current in-phase data bit value corresponding to a current value of the in-phase data line (604) is low and a next pixel data value corresponding to a next bit of the representation of the character stored in the memory (210) is high; and
        transitions from an all-high data state (906) corresponding to an all-high standard line (610) to the in-phase data state (902) if the current in-phase data bit value is high and the next pixel data value is low.

38. The system (100) recited in claim 37, wherein the microcontroller (204) operates as a state machine that maintains itself in the in-phase data state (902) if the current in-phase data bit value does not equal the next pixel data value.

39. A system (100) that processes digital video data, comprising:
    a processor (110) that produces a digital video data stream (112); and
    a character generator (200) that selects a pixel data value from one of a plurality of standard data lines (604, 606, 608, 610) to insert into the digital video data stream (112) based on a representation of a character stored in a memory (210) associated with the character generator (200), the character generator (200) comprising a microcontroller (204) operating as a state machine that:
- transitions from an in-phase data state (902) corresponding to an in-phase standard data line (604) to an all-high data state (906) corresponding to an all-high standard line (610) if a current in-phase data bit value corresponding to a current value of the in-phase data line (604) and a next pixel data value of the representation of the character stored in the memory (210) are both high; and
- transitions from an anti-phase data state (904) corresponding to an anti-phase standard data line (608) to the all-high data state (906) if the current in-phase data bit value is low and the next pixel data value is high.

40. The system (100) recited in claim 39, wherein the microcontroller (204) operates as a state machine that maintains itself in the all-high data state (906) if the next pixel data value is high.

41. A system (100) that processes digital video data, comprising:
- a processor (110) that produces a digital video data stream (112); and
- a character generator (200) that selects a pixel data value from one of a plurality of standard data lines (604, 606, 608, 610) to insert into the digital video data stream (112) based on a representation of a character stored in a memory (210) associated with the character generator (200), the character generator (200) comprising a microcontroller (204) operating as a state machine that:
  - transitions from an in-phase data state (902) corresponding to an in-phase standard data line (604) to an all-low data state (908) corresponding to an all-low standard data line (606) if a current in-phase data bit value corresponding to a current value of the in-phase data line (604) and a next pixel data value of the representation of the character stored in the memory (210) are both low; and
  - transitions from an anti-phase data state (904) corresponding to an anti-phase standard data line (608) to the all-low data state (908) if the current in-phase data bit value is high and the next pixel data value is low.

42. The system (100) recited in claim 41, wherein the microcontroller (204) operates as a state machine that maintains itself in the all-high data state (906) if the next pixel data value is high.

43. A system (100) that processes digital video data, comprising:
- a processor (110) that produces a digital video data stream (112); and
- a character generator (200) that selects a pixel data value from one of a plurality of standard data lines (604, 606, 608, 610) to insert into the digital video data stream (112) based on a representation of a character stored in a memory (210) associated with the character generator (200), the character generator (200) comprising a microcontroller (204) operating as a state machine that:
  - transitions from an all-high data state (906) corresponding to an all-high standard line (610) to an anti-phase data state (904) corresponding to an anti-phase standard data line (608) if a current in-phase data bit value corresponding to a current value of the in-phase data line (604) and a next pixel data value of the representation of the character stored in the memory (210) are both low; and
  - transitions from an all-low data state (908) corresponding to an all-low standard data line (606) to the anti-phase data state (904) if the current in-phase data bit value is high and the next pixel data value is low.

44. The system (100) recited in claim 43, wherein the microcontroller (204) operates as a state machine that maintains itself in the anti-phase data state (904) if the current in-phase data bit value equals the next pixel data value.

45. A system (100) that processes digital video data, comprising:
- a processor (110) that produces a digital video data stream (112); and
- a character generator (200) that selects a pixel data value from one of a plurality of standard data lines (604, 606, 608, 610) to insert into the digital video data stream (112) based on a representation of a character stored in a stored in a memory (210) associated with the character generator (200), the character generator (200) comprising a microcontroller (204) operating as a state machine that:
  - transitions from an all-low data state (908) corresponding to an all-low standard data line (606) to an in-phase data state (902) corresponding to an in-phase standard data line (604) if a current in-phase data bit value corresponding to a current value of the in-phase data line (604) is low and a next pixel data value corresponding to a next pixel data value of the representation of the character stored in the memory (210) is high;
  - transitions from an all-high data state (906) corresponding to an all-high standard line (610) to the in-phase data state (902) if the current in-phase data bit value is high and the next pixel data value is low;
  - transitions from the in-phase data state (902) to the all-high data state (906) if the current in-phase data bit value and the next pixel data value are both high;
  - transitions from an anti-phase data state (904) corresponding to an anti-phase standard data line (608) to the all-high data state (906) if the current in-phase data bit value is low and the next pixel data value is high;
  - transitions from the in-phase data state (902) to the all-low data state (908) if the current in-phase data bit value and the next pixel data value are both low;
  - transitions from the anti-phase data state (904) to the all-low data state (908) if the current in-phase data bit value is high and the next pixel data value is low;
  - transitions from the all-high data state (906) to the anti-phase data state (904) if the current in-phase data bit value and the next pixel data value are both low; and
  - transitions from the all-low data state (908) to the anti-phase data state (904) if the current in-phase data bit value is high and the next pixel data value is low.

46. The system (100) recited in claim 45, wherein the microcontroller (204) operates as a state machine that maintains itself in the in-phase data state (902) if the current in-phase data bit value does not equal the next pixel data value.

47. The system (100) recited in claim 45; wherein the microcontroller (204) operates as a state machine that maintains itself in the all-high data state (906) if the next pixel data value is high.

48. The system (100) recited in claim 45, wherein the microcontroller (204) operates as a state machine that maintains itself in the all-low data state (908) if the next pixel data value is low.

49. The system (100) recited in claim 45, wherein the microcontroller (204) operates as a state machine that maintains itself in the anti-phase data state (904) if the current in-phase data bit value equals the next pixel data value.

* * * * *